July 14, 1959  K. KARNATH ET AL  2,894,763
APPARATUS FOR DISCONNECTING TRAILER SERVICE
AND MECHANICAL COUPLINGS
Filed May 23, 1956  5 Sheets-Sheet 1
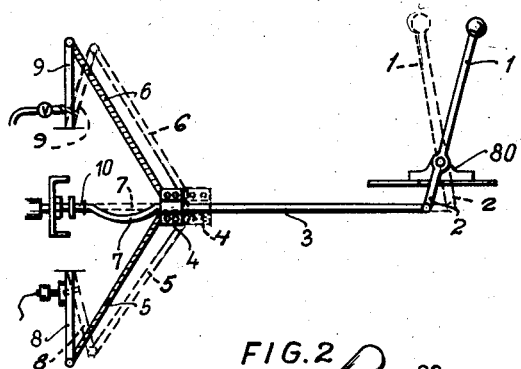
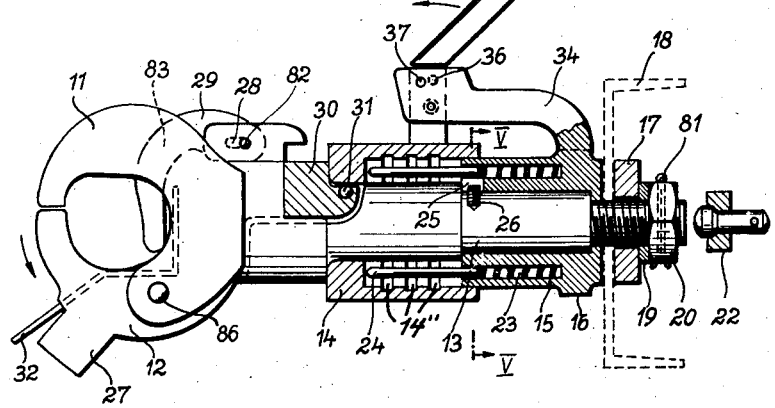
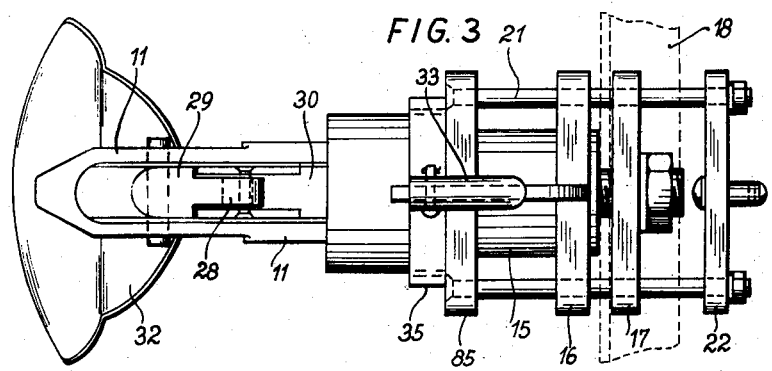
INVENTORS:
K. Karnath
K.-Jürgen Karnath
G. Karnath
By Lowry & Rinehart
ATTYS.

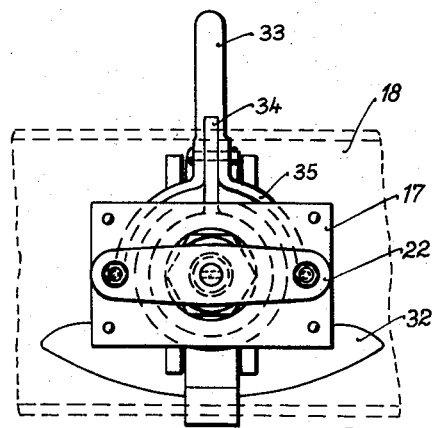
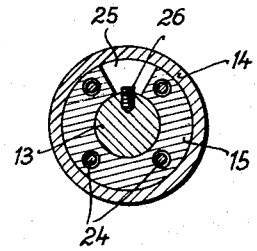
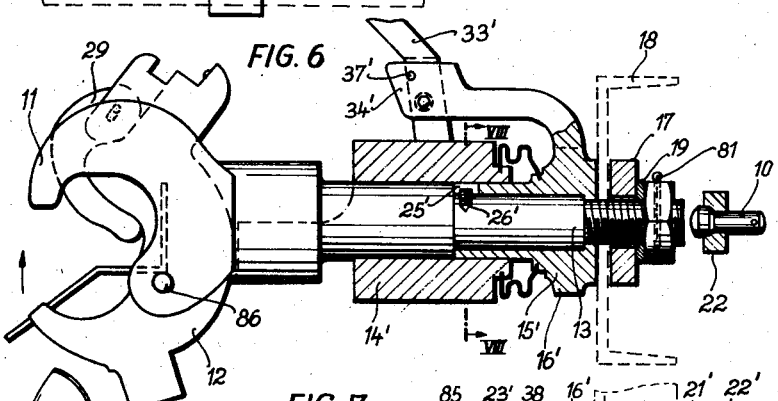
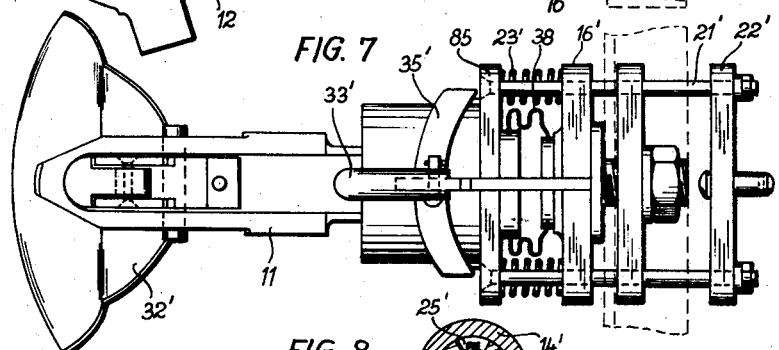
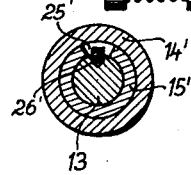

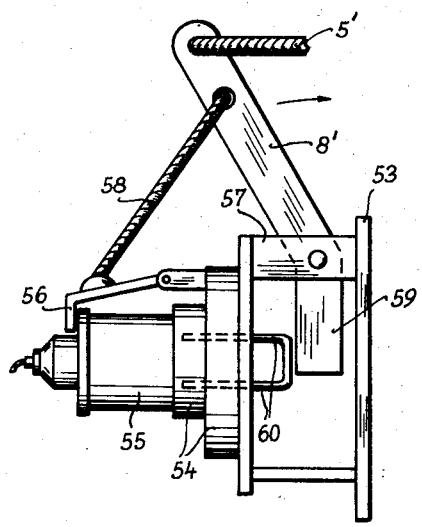
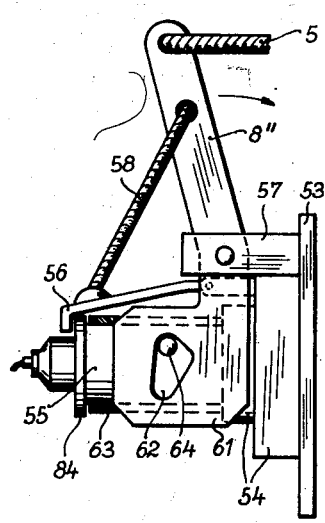
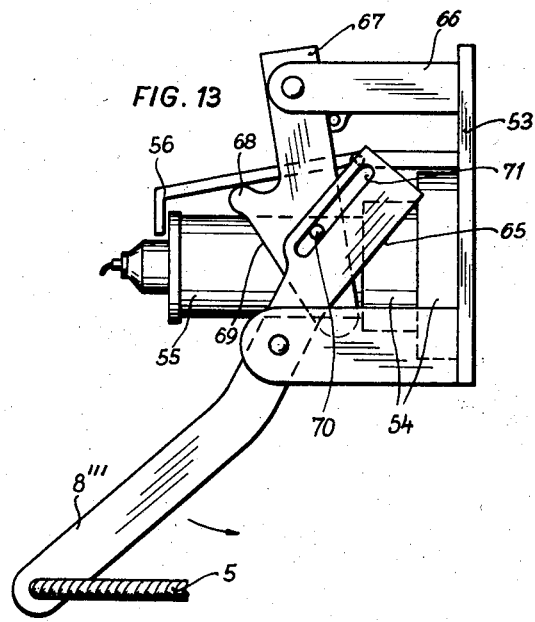

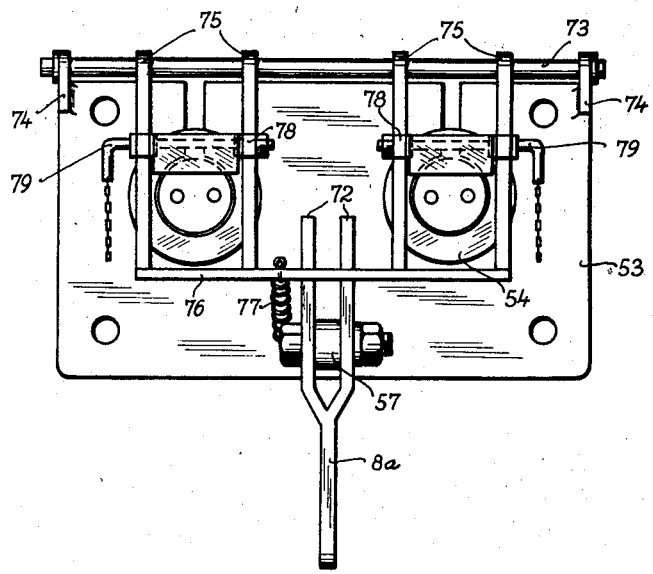
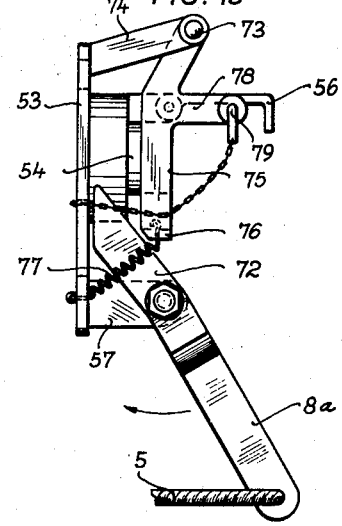

United States Patent Office 2,894,763
Patented July 14, 1959

2,894,763

APPARATUS FOR DISCONNECTING TRAILER SERVICE AND MECHANICAL COUPLINGS

Kürth Karnath and Klaus-Jürgen Karnath, Wiesbaden, and Günther Karnath, Kiel, Germany; said Kürth Karnath and said Günther Karnath assignors to said Klaus-Jürgen Karnath Application May 23, 1956, Serial No. 586,794

Claims priority, application Germany September 27, 1955

16 Claims. (Cl. 280—421)

The present invention relates to trailer couplings, and more specifically to an apparatus for coupling a towing vehicle to a trailer.

According to the invention the apparatus for coupling a towing vehicle to a trailer comprises at least one lighting coupling, a brake coupling, a mechanical coupling, remotely operable means for disconnecting the couplings, and an operating device for operating said means.

To enable a trailer to be unhitched automatically and without risk from the driver's seat of the towing vehicle, the apparatus may be designed so that the operating device can be operated by a lever from the driver's seat. In this manner the unhitching of the trailer requires only the actuation of a single element.

It may be arranged that the mechanical coupling is opened only after the lighting and brake couplings. In this manner breaking of the brake and light cables is prevented. This may be achieved by arranging that when all three couplings are closed, the connections between the operating device and the brake coupling and the lighting coupling include cables which are taut in this condition of the couplings while the connections between the mechanical coupling and the operating device includes a cable which is slack in this condition of the couplings.

The operating device may comprise a tow hook device operated pneumatically through the intermediary of a compressed-air operated plunger.

The mechanical coupling may comprise a stepped cylindrical shaft, a stationary jaw member at one end of said shaft, a movable jaw member pivoted to said stationary jaw member, the weight and arrangement of the movable jaw member being such as to tend to hold the jaw members in open position, a coupling sleeve movable from a position in which it holds the movable jaw member fixed relatively to the stationary jaw member into a position in which the movable jaw member is released, spring-loaded means urging the coupling sleeve into the former position, and releasing means whereby the coupling sleeve is moved into the latter position on the remotely operable means.

The brake coupling may comprise two members which, when the brake coupling is closed, are connected together by a bayonet joint to form a closed brake air conduit, a supporting plate secured to the towing vehicle and having one of the members fixedly mounted thereon, a lever pivotally mounted on said supporting plate and rotated by the operating device of the remotely operable means, the lever co-operating with the other of the said members so that rotation of said lever rotates said other member and releases the bayonet joint.

The lighting coupling may comprise a base plate secured to the towing vehicle, a socket mounted on the base plate, a plug electrically connected to the trailer and co-operating with the socket when the lighting coupling is closed, means for ejecting the plug from the socket, a retaining clip movable between a position in which it prevents the plug from being removed and a position in which removal is permitted, and operating means which, on operation of the remotely operable means, moves the retaining clip to the position in which removal is permitted and operates the ejector to remove the plug from the socket.

By way of example some preferred embodiments of the invention will now be described with reference to the accompanying drawings in which:

Fig. 1 illustrates the method of releasing a lighting, brake and mechanical coupling between a towing vehicle and a trailer, the released position being shown by dotted lines;

Fig. 2 shows, partly in side elevation and partly in vertical section, a mechanical coupling in its closed or coupling condition;

Fig. 3 is a plan view of the coupling shown in Fig. 2;

Fig. 4 is a rear end view of the coupling shown in Figs. 2 and 3;

Fig. 5 is a section on the line V—V of Fig. 2;

Fig. 6 shows, partly in side elevation and partly in vertical section, an alternative mechanical coupling in its open or non-coupling condition;

Fig. 7 is a plan view of the coupling shown in Fig. 6;

Fig. 8 is a section on the line VIII—VIII of Fig. 6;

Figs. 11–13 show in side elevation, three alternative forms of lighting coupling in closed or coupling condition;

Fig. 14 is a front end view of a device embodying two adjacent lighting couplings, and Fig. 15 is a side elevation of the device shown in Fig. 14.

Figure 9:
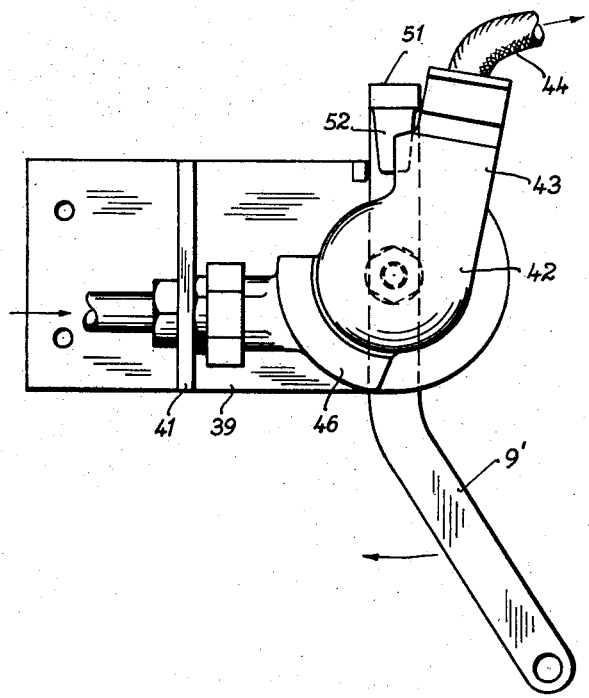
Fig. 9 shows in side elevation, a brake coupling in closed or coupling condition.

As shown in Fig. 1, a two-armed operating lever 1, 2 is pivotally mounted in a bearing 80 beside the driver's seat in a towing vehicle and one end of a pull cable or a rod 3 is attached to the lever arm 2 which is shorter than the lever arm 1. By means of an adaptor 4 three short lengths of cable 5, 6 and 7 are attached with one of their ends to the other end of the cable 3. At their opposite ends the cables 5 and 6 are connected through the intermediary of levers 8 and 9 to the lighting and brake couplings, respectively, and are taut when these couplings are in their closed conditions, as shown. The cable 7 is connected at its opposite end to the mechanical coupling through a pin 10 and is slack when the other couplings are closed.

When the lever 1, 2 is pulled back, the short arm 2 thereof pulls the cable 3 forward as shown by the dotted lines in Fig. 1. Through the cables 5 and 6, the levers 8 and 9 will be operated so that the brake and lighting couplings are opened or released. By releasing these couplings, the slack of cable 7 will be taken up, pulling the pin 10 on the mechanical coupling forward, whereby the mechanical coupling is released. In this manner, first the brake and the lighting couplings are released or opened and then the mechanical coupling is released immediately afterwards so that all connection between the trailer and the towing vehicle is broken.

Particularly suitable forms of the mechanical coupling are the devices shown in Figs. 2–8. As is usual in such devices, the tow hook consists of an upper stationary jaw member 11 and a lower movable jaw member 12. The stationary jaw member 11 is slotted to receive the movable jaw member 12 pivoted thereto at 86 so as to be movable in a vertical plane. A stationary, stepped cylindrical shaft 13 extends rearwardly from the stationary jaw member 11.

Mounted on the shaft 13 is a bearing bush 15 (Fig. 2)

or 15' (Fig. 6). The shaft 13 also carries a coupling sleeve 14 (Fig. 2) or 14' (Fig. 6) which is known per se and slidable along the bush 15 or 15', respectively, and the shaft 13. The end of the bush 15 or 15' over which the sleeve 14 does not slide, i.e. the rear end, is provided with a fixing flange 16 against which a conventional cross-member 18 provided on the towing vehicle abuts. The member 18 is held against the flange 16 by means of a counter flange 17 screwed on to a rearward extension of the shaft 13. The counter flange 17 is retained in position by a sliding or space washer 19, and a nut 20 held by a split pin 81. Two linkage rods 21 (Figs. 3 and 7) are slidable in lateral extensions of the flanges 16 and 17 and are fixed at one end to a cross-member 85 secured to the sleeve 14 and at the other to a cross-member 22 which is operated by the pin 10 at the end of the cable 7 to open the coupling when the lever 1, 2 is operated. The use of the two rods 21 and the flanges 16, 17 prevents the sleeve from twisting during operation. Grease grooves 14'' provided in the coupling sleeve 14 or 14', respectively, prevent the ingress of moisture and thus the formation of rust or ice which might impede the mobility of the coupling sleeve 14 (or 14') along the shaft 13 and bush 15 (or 15') on operation of the pin 10. The bearing bush 15 is provided with four equiangularly spaced bores to accommodate pressure springs 23 and co-operating pressure pins 24 which exert a constant pressure on the coupling sleeve 14. Furthermore, the front face of the bearing bush 15 (or 15') has a segment-shaped recess 25 (Fig. 5) into which projects a pin 26 fixed in the cylindrical shaft 13. The pin 26 is capable of limited movement in the recess 25 to allow the coupling a restricted rotation in both directions.

The nut 20 held by the split pin 81, is not fully tightened so that the coupling is enabled to perform the aforementioned rotation, with the nut 20 sliding on the sliding or space washer 19.

If, when the coupled vehicles are traveling downhill, the trailer presses against the coupling, the bearing bush 15 (or 15') transmits the pressure of the trailer to the towing vehicle via the fixing flange 16 to the cross-member 18. When, on the other hand, the coupling is in tension, the tensile stress is transmitted by the nut 20 via the sliding or space washer 19 and the counter flange 17 to the cross-member 18.

The movable jaw member 12 has a cylindrical appendix 27 whose weight tends to keep the jaw members 11, 12 of the tow hook in open position and also facilitates the closing of the coupling by hand. Mounted on the top of the movable jaw member 12 there is a mouth-contracting piece 29 which can be turned about a pin 82 passing through an elongated slot 28 in the piece 29 so as to pass through a slot 83 provided in the stationary jaw member 11 (as shown in the drawings). In this manner the size of the mouth of the tow hook can be adjusted to make it suitable also for trailers having small towing eyes.

At the end of an arm 30 extending rearwardly from the movable jaw member 12, there is inset a steel sphere or an arc-shaped roller 31 to reduce the friction resulting from movement of the coupling sleeve 14. A sheet metal guide piece 32 of known type serves for guiding the towing eye of the trailer into the towing hook when the trailer is being hitched on to the towing vehicle.

To enable the trailer coupling to be released independently of the remote control action of the driver, there is provided above the coupling sleeve 14 (or 14') a bell-crank hand release lever 33 pivoted in a bracket 34 provided on the bush 15 (or 15'). When the lever 33 is actuated, arms 35 provided on the lever 33 press the coupling sleeve 14 (or 14') back, thus releasing the rearwardly extending arm 30 so that the jaw members 11, 12 of the hook are opened. To hold the coupling sleeve 14 (or 14') in the open position, a pin can be inserted through holes 36 and 37 in the lever 33 and the bracket 34, respectively. The coupling in Fig. 6 is shown held in the open position by means of such a pin.

This arrangement provides the advantage that the driver can unhitch the trailer by operating the lever 33 without help even when the vehicles are stationary.

Figs. 6, 7 and 8 illustrate a modification of the coupling described with reference to Figs. 1–5. The coupling sleeve 14' of this modification has a single bore, instead of a skirt and flange, and no greased grooves. Furthermore, the bearing bush 15' of this modification has no bores with pressure springs and pressure pins. Springs 23', required to maintain the coupling sleeve 14' in its position when the tow hook is closed, are provided on the linkage rods 21' (Fig. 7) and are thus easily accessible for replacement. To afford protection against dirt, as bellows sleeve 38 of rubber is provided between the coupling sleeve 14' and the flange 16'. The hand release lever 33 is pivoted farther away from the front end of the bush 15' to make room for the bellows sleeve 38 and the bracket 34' is correspondingly lengthened. The other parts such as the pin 26' and the segment-shaped recess 25' remain unchanged.

Figure 10:
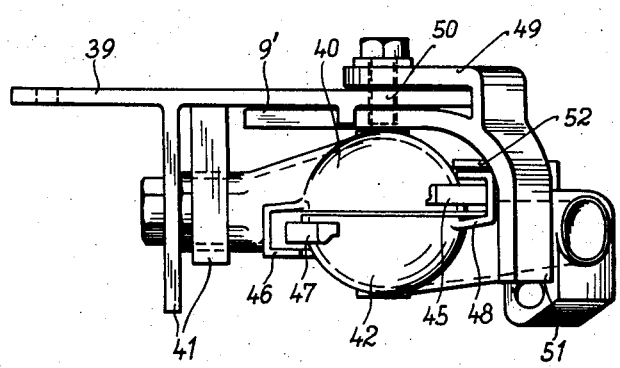
Fig. 10 is a plan view of the coupling shown in Fig. 9.

The pneumatic brake coupling shown in Figs. 9 and 10 is attached to the towing vehicle by means of a plate 39 having a bracket 41. A stationary coupling member 40 which remains on the towing vehicle after the brake coupling has been opened is fixedly mounted on the bracket 41.

A releasable coupling member 42 which co-operates with the coupling member 40 to complete the brake coupling has a tubular extension 43 and is connected to the brakes of the trailer by a tube 44. The members 40 and 42 are connected together when the coupling is closed by a bayonet connection. When the members 40 and 42 are locked together a bayonet spring 45 projecting from the stationary coupling member 40 engages in a groove 48 in the releasable coupling member 42, while a bayonet spring 47 projecting from the releasable coupling member 42 engages in a groove 46 in the stationary coupling member 40.

The lever 9' of the brake coupling pivots about a pin 50 mounted on the fixing plate 39. The pivot pin 50 also passes through a guide arm 49 which lies along the outside of the plate 39.

51 indicates the upper end of the lever 9' which is bent off to lie transversely of the coupling so that when the lever 9' is pulled (as shown by an arrow in Fig. 9), it acts upon the tubular extension 43 of the coupling member 42 and turns this member 42 about its axis until the bayonet springs 45, 47 have been moved out of their grooves 46, 48. The two members 40 and 42 are thus disconnected.

The lever 9' is provided with a guide nose 52 which, when the coupling is being opened, moves behind the tubular extension 43 and prevents it from twisting out of the plane of rotation.

A plate 53 serving as base plate for the lighting coupling shown in Fig. 11 is attached to the chassis of the towing vehicle and carries a socket 54 connected to the base plate 53 by means of brackets. Pivotally mounted on the upper of these brackets, 57, is the lever 8' which, when operated by the cable 5', opens the lighting coupling.

A plug 55 is provided with a cable leading to the trailer and is held in the socket 54 by means of a pivoted retainer clip 56. The retainer clip 56 is connected with the lever 8' by means of a short length of cable 58.

When the lever 8' having a longer arm and a shorter arm 59 is operated, the shorter arm 59 forces the limbs 60 of a U-shaped pin through the socket 54. Since the clip 56 will already have been moved out of the path of the plug 55 by the cable 58, movement of the limbs 60 will force the plug 55 from the socket 54.

When the towing vehicle is travelling without trailer, the retainer clip 56 covers the socket 54 so that no dirt can get into it.

In the modification shown in Fig. 12 the lever 8 terminates in a fork 61 having cutouts 62 in which pins 64 provided on a cylindrical sliding sleeve 63 engage. After the retainer clip 56 has been moved out of the path of the plug 55, further movement of the sleeve 63 will act on a flange 84 on the plug 55 and so push the plug 55 out of the socket 54.

In the further modification shown in Fig. 13, the lever 8''' likewise terminates in a fork 65. In this case, two cam levers 67, provided with inwardly turned heels 68 and pushing edges 69, are pivotally linked on to a bracket 66 provided on the base plate 53. Pins 70 project from said cam levers 67 into slots 71 in the fork 65.

When the lever 8''' is pulled, the heels 68 first lift the retainer clip 56, and then the pushing edges 69 on the cam levers 67 act on the plug 55 to force it out of the socket 65.

It is sometimes desirable for two lighting couplings to be mounted side-by-side and an arrangement for doing this is illustrated in Figs. 14 and 15.

Two sockets 54 are mounted on a base plate 53 attached to the towing vehicle. The lever 8ª, pivotally attached to the bracket 57 on the base plate, terminates in a fork 72.

Above the two sockets 54 there is provided a spindle 73 which is rotatably mounted in two brackets 74 secured to the base plate 53 and on which two double levers 75 are keyed; the bottom ends of these levers are connected together by a bar 76. The spindle 73, the two double levers 75 and the rod 76 form a firm frame which is pivotally borne between the brackets 74. The fork 72 of the lever 8ª acts behind the bar 76 which is connected via a tension spring 77 with the base plate 53. The double levers have appendices 78 provided with bores to accept a pin 79 which grips underneath the retainer clip 56.

The frame formed by the spindle 73, the double levers 75 and the bar 76 is held in position by the tension spring 77 so that the plugs are prevented from being shaken out of the sockets while the vehicle is travelling by means of the retainer clips 56.

When the lever 8 is actuated, the frame is raised so that the pins 79, provided in the appendices 78, raise the two retainer clips, and the double levers 75 then force the plugs from the sockets 54.

When the towing vehicle travels without trailer, the pins are withdrawn from the bores in the appendices 78 of the double levers 75, and the retainer clips are folded down so that the sockets are covered and dirt is prevented from getting into them.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

We claim:

1. An apparatus for uncoupling a trailer from a towing vehicle initially connected to each other by means of a mechanical coupling on the towing vehicle engaging a towing shaft with a horizontal eye on the trailer, said mechanical coupling having a release means, and air-brake and lighting couplings of standard type provided with release levers on said towing vehicle, characterized by an operating means located in the vicinity of the driver's seat and connected through the intermediary of a common pull member and connecting elements therefrom to said release levers of the lighting and brake couplings and to said release means, the connecting elements between the pull member and said release levers consisting of links and the connecting element between said pull member and said release means of the mechanical coupling consisting of a normally slack line, so that said release means of the mechanical coupling will be operated only after the lighting and brake couplings have been released.

2. An apparatus as claimed in claim 1, wherein the mechanical coupling comprises a stepped cylindrical shaft, a stationary jaw member at one end of said shaft, a movable jaw member pivoted to said stationary jaw member, the weight and arrangement of the movable jaw member being such as to tend to hold the jaw members in open position, a coupling sleeve movable from a position in which it holds the movable jaw member in closed position into a position in which the movable jaw member is released, spring-loaded means urging the coupling sleeve into said closed jaw position, said release means comprising means for moving said coupling sleeve against said spring-loaded means into its jaw-release position.

3. An apparatus as claimed in claim 2, wherein said release means includes two rods rigidly connected to the coupling sleeve at least one cross-member connected to said rods, and guide means for slidably supporting said rods between the coupling sleeve and the cross-member.

4. An apparatus as claimed in claim 3, wherein a pressure spring is mounted over each of said rods between said coupling sleeve and said guide means.

5. An apparatus as claimed in claim 2, wherein the stepped cylindrical shaft of the stationary jaw member has a reduced threaded end adapted for mounting through a support plate on said towing vehicle and is provided with a bearing bush having a mounting flange over said reduced end of said shaft and at least two bores extending parallel to the axis of the coupling sleeve, said coupling sleeve being slidably mounted on said bearing bush between its specified positions, and the spring-loaded means for biasing said coupling sleeve into jaw-closed position comprising a pin extending into each of said bores to abut against a spring contained therein, said bores located on a circle and equiangularly spaced from each other, in the bearing bush.

6. An apparatus as claimed in claim 2, wherein said movable jaw has an axially slotted lug portion, and a mouth-contracting piece pivotally mounted in said slotted lug and extending into the mouth between the movable jaw member and the stationary jaw member.

7. An apparatus as claimed in claim 2, wherein a bearing bush is oscillatably mounted on the stepped cylindrical shaft of the stationary jaw member, stop means on said shaft for limiting said oscillation to a small angle about said shaft, said stop means comprising a pin projecting from said shaft into a recess in the bearing bush.

8. An apparatus as claimed in claim 2, wherein the coupling sleeve is slidable between its specified positions and a bellows member fixed to said sleeve and the end of said shaft to exclude dirt.

9. An apparatus as claimed in claim 2, wherein the mechanical coupling incorporates a lever pivotably mounted on said shaft and adapted for operating independently of the said pull member to move the coupling sleeve to the position in which the movable jaw member is released.

10. An apparatus as claimed in claim 2, wherein the mechanical coupling incorporates a lever pivotably mounted on said shaft and adapted for operating independently of said pull member to move the coupling sleeve to the position in which the movable jaw member is released, a bracket on said shaft providing the pivotal support for said lever, matching holes being provided in the lever and the bracket, and a lock pin for passing through said holes to hold the lever in the position in which the movable jaw member is released.

11. An apparatus as claimed in claim 1, wherein said brake coupling comprises two members having a bayonet connection to form a closed brake air conduit, a supporting plate secured to the towing vehicle and having one of the members fixedly mounted thereon, a lever pivotally mounted on said supporting plate on the axis of said connection for operation by said pull member, said lever co-operating with the other of the said members so that operation of said lever rotates said other member and releases the bayonet joint.

12. An apparatus as claimed in claim 11, wherein said pivotally mounted lever is provided with a nose for guiding the rotary brake coupling member out of its bayonet connection.

13. An apparatus as claimed in claim 1, wherein the lighting coupling comprises a base plate secured to the towing vehicle, a socket mounted on the base plate, a plug electrically connected to the trailer adapted for connection to the socket when the lighting coupling is closed, means for ejecting the plug from the socket, a retaining clip movable between a position in which it prevents the plug from being removed and a position in which removal is permitted, and operating means which, on operation of the pulling member, moves the retaining clip to the position in which removal is permitted and operates the ejector to remove the plug from the socket.

14. An apparatus as claimed in claim 13, wherein the operating means comprise a slotted forked lever and the means for ejecting the plug include at least one cam lever, both levers being pivotally mounted on the base plate and in operative engagement with each other for releasing the retaining clip and immediately thereafter ejecting the plug from the socket on operation of the pulling member.

15. An apparatus as defined in claim 14, characterized in that the operating means comprises an operating lever connected to one end of said pull member.

16. An apparatus as claimed in claim 1, wherein the lighting coupling comprises a base plate secured to the towing vehicle, at least two sockets mounted on said base plate and each provided with a co-operating plug when the coupling is closed, a retaining clip for each socket movable from a position in which it prevents the corresponding plug from being removed into a position in which removal of the plug is permitted, the sockets having means associated therewith for releasing the retaining clips and ejecting the plugs from the sockets, said means including raising pins moving the retaining clips into the position in which removal of the plug is permitted and double levers operating the means for ejecting the plugs from the sockets on operation of the pulling member.

References Cited in the file of this patent

UNITED STATES PATENTS

| | | |
|---|---|---|
| 400,759 | Edwards | Apr. 2, 1889 |
| 1,580,825 | Griffith | Apr. 13, 1926 |
| 1,739,421 | Savage | Dec. 10, 1929 |
| 1,766,780 | Finch | June 24, 1930 |
| 2,457,478 | Letvin | Dec. 28, 1948 |
| 2,551,533 | Gernheuser | May 1, 1951 |
| 2,737,400 | De Witt | Mar. 6, 1956 |